US009623599B2

(12) United States Patent
Altmann et al.

(10) Patent No.: US 9,623,599 B2
(45) Date of Patent: Apr. 18, 2017

(54) SEAL FOR USE IN AN EXTRUSION DEVICE

(71) Applicant: KraussMaffei Technologies GmbH, München (DE)

(72) Inventors: Aron Altmann, München (DE); Mathias Geyer, München (DE)

(73) Assignee: KRAUSSMAFFEI TECHNOLOGIES GMBH, München (DE)

( * ) Notice: Subject to any disclaimer, the term of this patent is extended or adjusted under 35 U.S.C. 154(b) by 129 days.

(21) Appl. No.: 14/411,817

(22) PCT Filed: Jul. 5, 2013

(86) PCT No.: PCT/EP2013/064315
§ 371 (c)(1),
(2) Date: Dec. 29, 2014

(87) PCT Pub. No.: WO2014/006210
PCT Pub. Date: Jan. 9, 2014

(65) Prior Publication Data
US 2015/0158231 A1 Jun. 11, 2015

(30) Foreign Application Priority Data
Jul. 5, 2012 (DE) .................. 10 2012 106 035

(51) Int. Cl.
*B29C 47/08* (2006.01)
*B29C 47/00* (2006.01)
(Continued)

(52) U.S. Cl.
CPC ...... *B29C 47/0808* (2013.01); *B29C 47/0019* (2013.01); *B29C 47/0023* (2013.01);
(Continued)

(58) Field of Classification Search
CPC .... F16J 15/168; F16J 15/3292; F16J 15/3204; F16J 15/3208; F16J 15/322; F16J 15/3228; F16J 15/3268; B29C 47/0808
See application file for complete search history.

(56) References Cited

U.S. PATENT DOCUMENTS

RE19,820 E * 1/1936 Cherry et al. ........ B29C 35/065
34/242
3,509,890 A * 5/1970 Phillips ................ F16J 15/3228
134/122 R
(Continued)

FOREIGN PATENT DOCUMENTS

DE 102004008107 9/2004
DE 102008019321 12/2009
(Continued)

OTHER PUBLICATIONS

International Search Report issued by the European Patent Office in International Application PCT/EP2013/064315 on Oct. 8, 2013.

*Primary Examiner* — Nicholas L Foster
(74) *Attorney, Agent, or Firm* — Henry M. Feiereisen LLC

(57) ABSTRACT

A seal for use in an extrusion device for producing continuous profiles, in particular plastics pipes includes an elastic sealing disc, which is arranged in a plane approximately perpendicularly to the extrusion direction and has a through-passage opening letting through the continuous profile and having a sealing rim bearing against the continuous profile. Connection members are arranged along the sealing rim, and clamping elements are provided for exerting a force on the connection members, with the force acting radially with respect to the extrusion axis. The clamping elements are arranged in a plane parallel to the sealing disc, have a passage opening for the continuous profile and include (Continued)

connecting members for connecting the connection members to the clamping elements.

10 Claims, 5 Drawing Sheets

(51) Int. Cl.
  *B29C 47/90* (2006.01)
  *F16J 15/16* (2006.01)
  *F16J 15/32* (2016.01)
  *F16J 15/3292* (2016.01)
(52) U.S. Cl.
  CPC .......... *B29C 47/903* (2013.01); *B29C 47/905* (2013.01); *B29C 47/907* (2013.01); *F16J 15/168* (2013.01); *F16J 15/3292* (2013.01); *B29C 47/904* (2013.01)

(56) References Cited

U.S. PATENT DOCUMENTS

| | | | | |
|---|---|---|---|---|
| 4,386,996 A | * | 6/1983 | Landgraf | ............. B29C 47/021 |
| | | | | 156/244.14 |
| 4,626,183 A | * | 12/1986 | Shirai | ................. B29C 44/3403 |
| | | | | 264/102 |
| 9,434,100 B2 | * | 9/2016 | Dohmann | ............. B29C 47/903 |
| 2006/0038356 A1 | * | 2/2006 | Lehtinen | ................... F16L 5/10 |
| | | | | 277/549 |

FOREIGN PATENT DOCUMENTS

| | | |
|---|---|---|
| EP | 1 500 853 | 1/2005 |
| JP | H05-41758 | 6/1993 |
| WO | WO 2005/108830 | 11/2005 |
| WO | WO 2009/127567 | 10/2009 |

* cited by examiner

SEAL FOR USE IN AN EXTRUSION DEVICE

CROSS-REFERENCES TO RELATED APPLICATIONS

This application is the U.S. National Stage of International Application No. PCT/EP2013/064315, filed on Jul. 5, 2013, which designated the United States and has been published as International Publication No. WO 2014/006210 and which claims the priority of German Patent Application, Serial No. 10 2012 106 035.5, filed on Jul. 5, 2012 pursuant to 35 U.S.C. 119(a)-(d).

BACKGROUND OF THE INVENTION

The invention relates to a seal for use in an extrusion device for producing continuous profiles, in particular plastics pipes.

Seals of this type are known in a variety of embodiments. An established sealing principle is applied for example in pipe extrusion systems with a changeable pipe diameter in operation at the outlet of the vacuum chamber, between the vacuum chamber and the downstream water tank in the extrusion direction. The so-called segment seal comprises radially movable segments arranged around the pipe and in extrusion direction before the segment arrangement a simple elastic sealing disc with a passage opening for the extruded pipe. This functions because the flow direction (also sealing direction or pressure drop direction) acts contrary to the extrusion direction owing to the negative pressure in the vacuum tank. However, this principle can not be readily transferred to other regions of the extrusion system, as soon as the sealing direction and the extrusion direction are aligned. The sealing disc is then destroyed, because for example it remains adhered to the pipe or is drawn into the segment arrangement.

For example in extrusion direction behind the water tank, where the extrusion direction and the sealing direction are aligned, therefore frequently funnel seals have been used. These are indeed not destroyed, but are only at all practicable with very small diameters (approx. up to 250 mm) (the pressure build-up by the water is too great in the case of large diameters, so that a sealing action is no longer achieved) and have the disadvantage, within the region which is changeable in diameter, of the deficient sealing action in the case of smaller pipe diameters or so-called chattering in the case of larger diameters. Furthermore, such seals are subject to a large amount of wear, should therefore be easily replacable and advantageously have a lower cost for materials.

SUMMARY OF THE INVENTION

The invention is therefore based on the problem of providing a seal for use in an extrusion device which overcomes the disadvantages of the prior art.

This problem is solved by a seal for use in an extrusion device for producing continuous profiles, in particular plastics pipes, and including an elastic sealing disc, which is arranged in a plane approximately perpendicularly to the extrusion direction and has a through-passage opening letting through the continuous profile and having a sealing rim bearing against the continuous profile, and also has connection means arranged along the sealing rim, and clamping means for exerting a force on the connection means, with the force acting radially with respect to the extrusion axis, wherein the clamping means are arranged in a plane parallel to the sealing disc, have a passage opening for the continuous profile and comprise connecting means for connecting the connection means (128, 328) to the clamping means. Advantageous further developments are indicated in the subclaims.

The invention is based here on the idea of providing a seal for use in an extrusion device for producing continuous profiles, in particular plastics pipes, which comprises an elastic sealing disc with a through-passage opening for the continuous profile, wherein the through-passage opening can be widened or constricted by the application of a radial force. For this, close to the sealing rim, which lies in a crease-free manner against the continuous profile, surrounding the through-passage opening, connection means, for example eyes, are arranged on or in the sealing disc, which are connected with clamping means via connecting means, for example hooks or pins, which engage into the eyes. The clamping means exert a radial force onto the connection means and therefore onto the sealing rim. Depending on the direction of the radial force, radially outwards or inwards with respect to the extrusion axis, the sealing rim is therefore widened or constricted. The clamping means are arranged here in a plane approximately parallel to the sealing disc and also have a passage opening for the continuous profile.

The sealing disc is advantageously configured in a single piece, advantageously with a seamless, circumferential sealing rim. The term "in a single piece" includes here also several layers of one or more materials which are vulcanized, glued or otherwise connected in a planar manner on one another. In an advantageous embodiment, the sealing disc is configured in two layers, therefore has two layers which are connected securely with one another, for example glued, vulcanized on one another. Provision can then be made that the connection means, connecting means and/or clamping means are arranged at least partially between the layers. The connection means, connecting means and/or clamping means can therefore be arranged completely between the layers; or, for example, the connection means, e.g. in the form of eyes, are arranged partly between the layers, whilst the connecting means, e.g. in the form of hooks, and the clamping means, e.g. in the form of wire cables, are arranged outside the layers; or, for example, the connection means and connecting means between the layers and the clamping means, e.g. in the form of wire cables, which run from the interior (between the layers) outwards (outside the layers). The sealing disc is so elastic that a radial widening of the sealing rim and restoring into the initial state is possible. In the unstressed initial state, the sealing disc is arranged almost flat in a plane approximately perpendicularly to the extrusion direction. It is also possible to arrange several sealing discs axially one behind the other.

On or in the sealing disc, connection means for example in the form of rings or eyes, pins, hooks, screws, nuts, loops, thimbles, etc. are securely connected, for example vulcanized in, glued, etc., therewith, and are distributed along the sealing rim so that the latter always lies in a reliably sealing manner against the continuous profile. The connection means must be arranged so close to the sealing rim that the latter can be widened and constricted by a radial application of force onto the connection means.

The connection means are connected with the clamping means via connecting means. The connecting means can be configured for example as pins, hooks, rings, eyes, screws, nuts, loops, thimbles etc., which are mounted on the clamping means. Connection means and connecting means are expediently configured in a complementary manner to one another—for example, eye and pin, hook and eye, screw and nut, loop and hook, etc. A detachable connection between connection means and connecting means, such as for example eyes, which can be fitted onto pins, has the advantage that the wearing-out sealing disc can be quickly replaced. It is also possible that the connection means are connected with the connecting means in another way, for example are vulcanized in, glued, welded, spliced, etc., depending on the configuration of the connection means and connecting means. The connection must hold reliably in a force transmission between clamping means and connection means.

The clamping means are arranged advantageously in a plane parallel to the sealing disc. In advantageous embodiments, the clamping means are arranged close to the sealing disc, lying against the latter or introduced, for example vulcanized-in, into it. When several sealing discs are arranged axially one behind the other, the clamping means can also be arranged between the sealing discs.

By means of the clamping means, a radially acting force is exerted onto the connection means via the connecting means, so that the diameter of the through-passage opening is changed.

The clamping means preferably have a passage opening which is changeable in diameter, wherein the connecting means are advantageously arranged along the circumference of the passage opening so that through a change in diameter of the passage opening a change in diameter of the through-passage opening of the sealing disc is also brought about. It can be expedient to arrange the connecting means close to the passage opening of the clamping means, in order to be able to widen the through-passage opening of the sealing disc to the greatest possible extent. When the clamping means are integrated into the sealing disc, the passage opening is, as it were, implicitly included.

In an advantageous embodiment, the clamping means are configured as wire cables (also designated as cables, for example of metal or synthetic fibres) running radially with respect to the extrusion axis. Advantageously, thimbles or loops are formed as connecting means at the end of the wire cables facing the extrusion axis. In this case, the clamping- and connecting means would therefore be configured in a single piece. Further advantageously, the wire cables, together with thimbles, are vulcanized into the sealing disc, for example between two layers, so that the thimbles are fixed in the sealing disc, whilst the wire cables are displaceable in the sealing disc, for instance such as in a guide channel. For fixing the thimbles in the sealing disc for example anchor discs, for example of the same material as the layers of the sealing disc, can be vulcanized in as connection means inside the thimbles. The connection means are then configured as it were in one piece with the sealing disc. The wire cables and/or thimbles can also be arranged outside the sealing disc.

Alternatively, the connection means can be configured as eyes, for example sheet metal pieces with a hole, which are arranged completely or partially between the layers of the sealing disc and are securely connected therewith. The wire cables can have hooks at their ends facing the extrusion axis as connecting means which engage into the eyes. The eyes and wire cables can also be connected in another manner. A reverse connection is also conceivable, i.e. hooks as connection means and eyes as connecting means on the wire cables.

Drive means, for example a servomotor or pneumatic cylinder, can be provided for drawing in or paying out the wire cables. In an embodiment, a circumferential wheel can be provided as drive means, which is connected with the wire cables so that by turning the circumferential wheel the radial length of the wire cables is altered. This takes place for example by deflection of the wire cables on an outer diameter of the clamping means arrangement with respect to the passage opening from the radial course to a more circumferential course. This deflection can take place for example on a frame in which the sealing disc is fixed and is guided around the circumferential wheel. By turning the circumferential wheel, the sections of the wire cables running radially and running circumferentially are shortened or lengthened relative to one another. The circumferential wheel can be turned manually or again by means of a servomotor or similar. The frame can have a channel for the circumferentially running sections of the wire cables.

In another advantageous embodiment, the clamping means are configured as segments, for example of plastic or metal, aligned for instance radially with respect to the extrusion axis, distributed over the circumference, which enclose between them the passage opening on the extrusion axis. Advantageously, by radial moving of the segments, the diameter of the passage opening can be changed. The radial moving can take place by passive adapting to the pipe diameter, or actively with drive means, for example a servomotor or pneumatic cylinder.

In an advantageous embodiment, the segments are provided close to the passage opening with pins, running approximately axially, parallel to the extrusion axis, as connecting means, so that a sealing disc with correspondingly inlet eyes as connection means can be easily fitted. With the passive diameter adaptation, the segments are pushed radially outwards with an enlarging pipe diameter and entrain the sealing rim of the sealing disc owing to the connection by means of connecting means and connection means. When the pipe diameter becomes smaller again, the segments move radially inwards again, for example through the elastic effect of the sealing disc or additional elastic elements. With a passive adaptation of the through-passage opening to the cross-section of the continuous profile, in particular the pipe diameter, the restoring force of the sealing disc (owing to its elasticity) and, if present, the restoring force of the segments (for example through springs) must be configured so that with an increase in size of the pipe diameter the contact pressure by the sealing disc and/or the segments is not too high and the pipe is not damaged. The radial moving of the segments can, as mentioned, also be supported by the assistance of drive means.

In a further advantageous embodiment, the clamping means are configured as struts, distributed over the circumference, arranged in a plane approximately perpendicularly to the extrusion axis, which enclose the passage opening in their centre, on the extrusion axis. In an advantageous embodiment, the struts are mounted pivotably by their one end on an outer diameter of the clamping means arrangement with respect to the passage opening, whilst their opposite ends, facing the extrusion axis, engage displaceably into one another and run approximately tangentially to the passage opening, so that by pivoting the struts the diameter of the passage opening is changed. The change in diameter of the passage opening can again take place passively or actively, as already described above.

In an advantageous embodiment, at the ends of the struts facing the extrusion axis, pins running parallel to the extrusion axis are provided as connecting means, so that a sealing disc with correspondingly let-in eyes as connection means can be easily fitted. The longer the struts are, or respectively the further the pivot points lie from the extrusion axis, the more the curve described by the pins comes close to the radius course in the case of a change of diameter. It is therefore advantageous to select the distance between pivot points and extrusion axis to be as large as possible, in order to prevent a twisting of the sealing disc about the extrusion axis, or at least to keep it very small.

The clamping means, for example in their embodiment as segments or struts, can be configured as a support construction for the axial supporting of the sealing disc. The clamping means are then positioned with respect to the sealing disc so that an axial movement of the sealing rim along the continuous profile is largely prevented. This has the advantage, for example, that the sealing disc can be configured to be relatively thin, so that less material consumption is necessary for the wearing-out sealing disc. In addition, in this way the restoring force of the sealing disc can be kept relatively small, which enables a passive diameter adaptation of the clamping means which are configured as a support construction.

The clamping means and connecting means can be configured in one piece with one another, for example wire cable as clamping means with formed loop or thimble as connecting means or segments formed in one piece with pins as clamping- and connecting means.

As already mentioned above, drive means, such as for example a servomotor or a pneumatic cylinder, can be provided in order to provide the clamping means with a radial traction- or thrust force. In the case of the configuration of the clamping means as wire cables running radially with respect to the extrusion axis, a circumferential wheel can be provided as drive means, as mentioned above, which is connected with the wire cables so that by turning the circumferential wheel the radial length of the wire cables is changed. Furthermore, control means can be provided for the automatic control or regulation of the drive means as a function of the cross-section of the continuous profile, in particular of the pipe diameter.

The seal according to the invention therefore has several advantages—it is able to be used flexibly, independently of the sealing direction, offers a reliable sealing action (also in the case of great changes in pipe diameter), whilst chattering or respectively stick-slip effects are avoided, is easily replacable and operable, is more favourably priced and in addition brings about a saving of space through smaller axial dimensions.

BRIEF DESCRIPTION OF THE DRAWING

The invention is explained in further detail below with the aid of example embodiments and with reference to the drawings. Further advantageous configurations can be seen from the example embodiments.

DETAILED DESCRIPTION OF PREFERRED EMBODIMENTS

Figure 1:
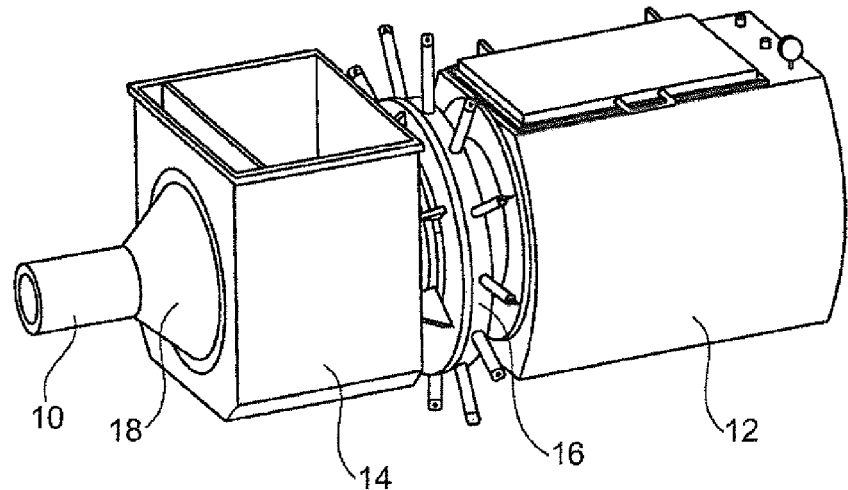
FIG. 1 shows a section of an extrusion line with a funnel seal and a segment seal according to the prior art.

FIG. 1 shows a section of an extrusion line, here for the production of pipes, with a pipe 10 running through a vacuum tank 12 and a water collection container 14 and with a known segment seal 16 between vacuum tank 12 and water collection container 14 and a funnel seal 18 at the outlet of the water collection container 14.

Therein, the segment seal 16 comprises only an elastic, approximately flat sealing disc arranged perpendicularly to the extrusion axis with a through-passage opening for the extrude pipe 10 and radially movable segments arranged in extrusion direction behind and parallel to the sealing disc. As the flow direction, owing to the negative pressure in the vacuum tank 12, acts contrary to the extrusion direction, this principle functions without destroying the simple sealing disc.

At the outlet of the water collection container 14, these forces which oppose one another do not exist; the extrusion direction and flow direction are aligned. Therefore, the segment seal can not be used at this point; it would be destroyed. Therefore, a funnel seal 18 has been used, as shown in FIG. 1. However, in the case of small pipe diameters, this has become leaky and, in the case of larger pipe diameters, caused so-called chattering. In addition, the funnel seal was no longer able to be used for very large pipe diameters (in the adjustment range 250 to 450 mm).

Figure 2:
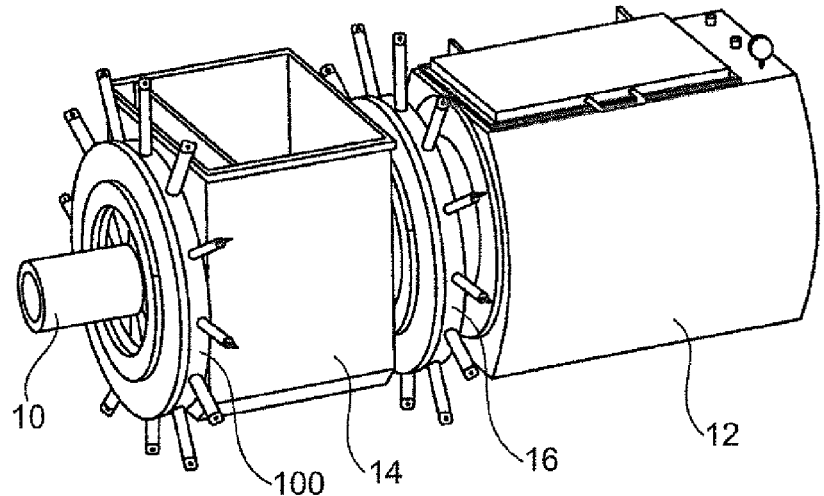
FIG. 2 shows the section of an extrusion line illustrated in FIG. 1 with a seal according to the invention, instead of the funnel seal.

FIG. 2 now shows the section of an extrusion line illustrated in FIG. 1 with vacuum tank 12 and water collection container 14 and with a segment seal 16 arranged between vacuum tank 12 and water collection container 14. However, instead of the funnel seal at the outlet of the water collection container 14 a seal 100 according to the invention, in accordance with a first example embodiment, is arranged.

Figure 3:
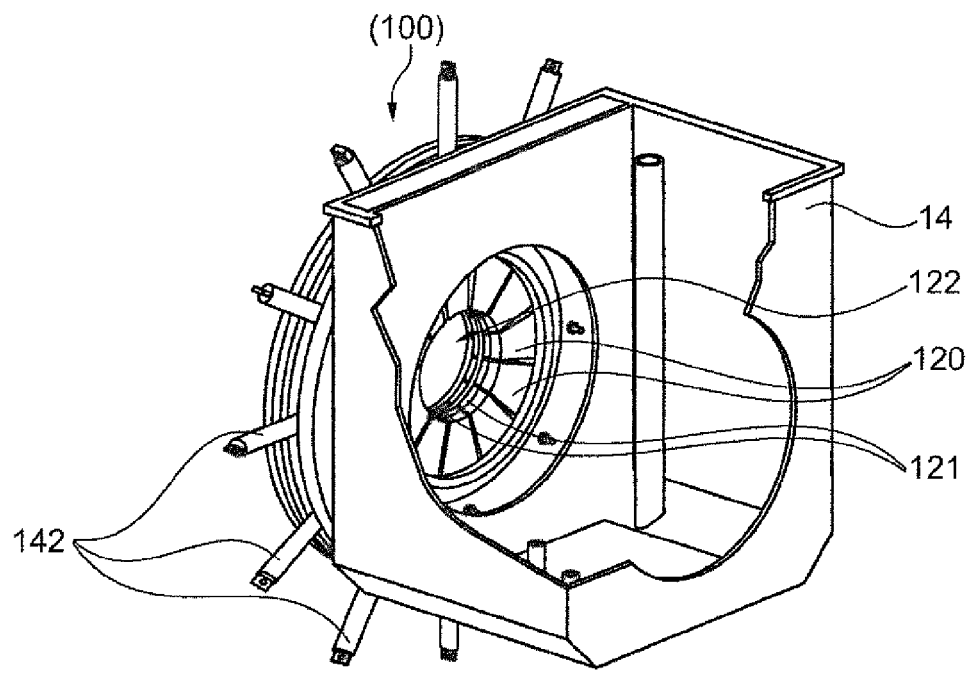
FIG. 3 shows a portion of a seal according to the invention in accordance with a first example embodiment of the invention with radial segments as clamping means.

FIG. 3 shows a portion of the seal 100 according to the invention in accordance with the first example embodiment with radially aligned clamping means, arranged circumferentially in a plane perpendicularly to the extrusion axis, in the form of segments 120, which in their radial centre, on the extrusion axis, form a passage opening 122 for the extruded pipe which is not illustrated this figure. In this example embodiment, the segments 120 are made of plastic. The segments 120 have segment rolls 121 along the passage opening 122, which lie against the pipe 10 and roll along its surface, in order to keep the friction as small as possible. The segments 120 are arranged so as to be radially moveable and in the case of an enlargement of diameter of the pipe 10 are pressed outwards by the pressure of the pipe 10. This radial movement can be assisted in addition by drive means, for example servomotors or, as in this example embodiment, pneumatic cylinders 142.

Figure 4:
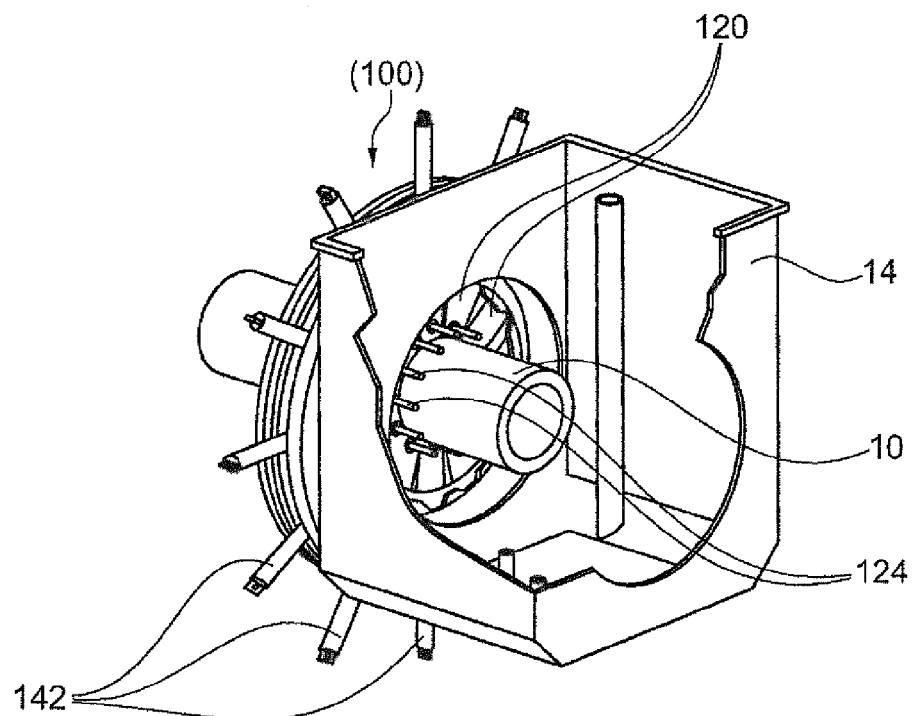
FIG. 4 shows a portion of a seal according to the invention in accordance with the first example embodiment of the invention with radial segments as clamping means and pins as connecting means.

FIG. 4 shows a portion of the seal 100 according to the invention in accordance with the first example embodiment with the elements of FIG. 3 and additionally with carrier pins 124, mounted on the segments 120, as connecting means. The carrier pins 124, for example made of metal or plastic, are arranged circumferentially close to the passage opening 122 for the extruded pipe 10 and are aligned approximately parallel to the extrusion axis.

Figures 5, 6:
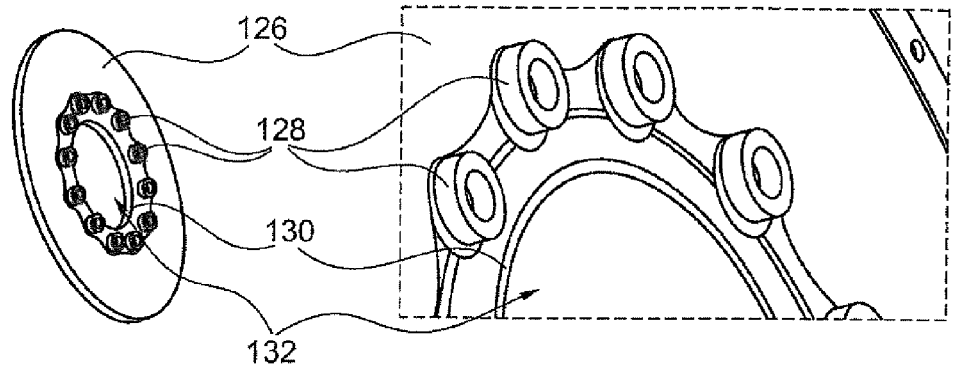
FIG. 5 shows a sealing disc with vulcanized-in rings as connection means in accordance with the first example embodiment of the invention.
FIG. 6 shows an enlarged cut-out of FIG. 5.

FIG. 5 shows a sealing disc 126 with a through-passage opening 132, a sealing rim 130 surrounding the through-passage opening 132, and carrier rings 128, arranged close to the sealing rim 130, as connection means. FIG. 6 shows an enlarged cut-out of FIG. 5. As can be readily seen in these figures, the sealing disc 126 is substantially flat in the unclamped initial state. In this example embodiment, the sealing disc 126 is in addition in one piece and the sealing rim 130 is configured so as to be seamlessly circumferential. In this example embodiment, the carrier rings 128, for example made of metal, are vulcanized on, and the sealing disc 126 is reinforced in the region of the carrier rings 128, close to the sealing rim 130. Of course, the carrier rings can also be mounted in a different way on or in the sealing disc, for example by stamping in or riveting in, or stabilizing elements can be dispensed with and, for example, merely holes can be stamped into the sealing disc.

The arrangement of the carrier pins 124 on the segments 120 and the arrangement of the carrier rings 128 on the sealing disc 126 are coordinated with one another, in a complementary manner to one another, so that when the carrier rings 128 are pushed over the carrier pins 124, the sealing disc 126 is arranged approximately flat in front of the segments 120 and the sealing rim 130 lies against the pipe 10.

Figure 7:
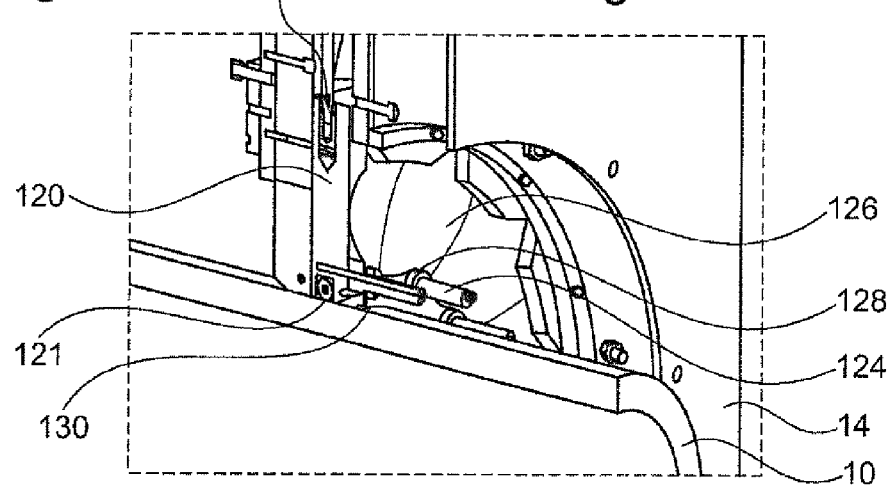
FIG. 7 shows a section of a seal according to the invention in accordance with the first example embodiment of the invention, in operation.
Figure 8:
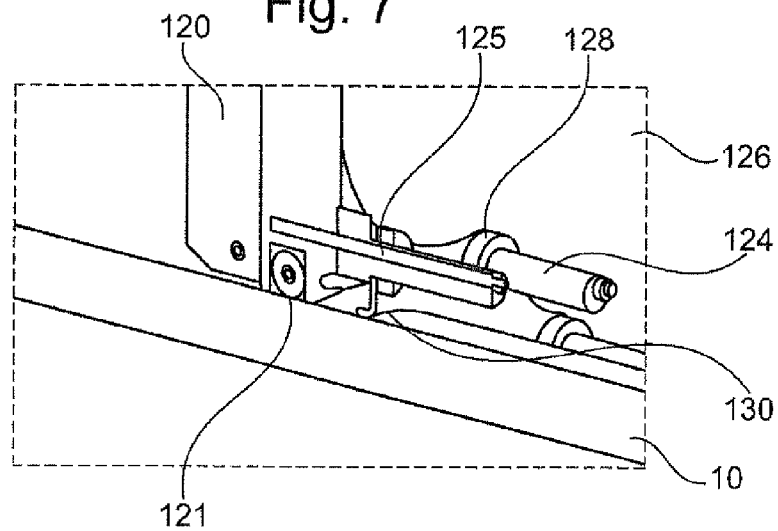
FIG. 8 shows an enlarged cut-out of FIG. 7.

FIG. 7 shows the seal 100 according to the invention in accordance with the first example embodiment, in operation. FIG. 8 shows an enlarged cut-out of FIG. 7. The seal 100 comprises the segments 120 with the carrier pins 124 and the sealing disc 126 with the carrier rings 128. Segment rolls 121, arranged at the radially inner end of the segments 120, are also illustrated, which lie against the pipe 10 and roll along its surface, in order to cause as little friction as possible. In this example embodiment, the segments 120 are configured as a support construction and support the sealing disc 126 axially against the water pressure, acting in extrusion direction, of the water in the water collection container 14—in FIG. 7 it can be seen how the sealing disc 126 lies against the segments 120.

The carrier pins 124 are mounted close to the passage opening 122, distributed over its circumference and aligned parallel to the extrusion axis on the segments 120. In this example embodiment, the carrier pins 124 are anchored to the segments 120 by means of carrier pin anchors 125, which penetrate the segments 120 and the carrier pins 124 axially. Of course, there are also several alternative fastening possibilities, for example by the carrier pins penetrating the segments directly or by segments being produced in one piece with carrier pins.

The carrier rings 128 are fitted onto the carrier pins 124, so that the sealing disc 126 in its unstressed initial state is arranged approximately flat in extrusion direction in front of the segments 120. Here, the sealing rim 130 lies against the pipe 10. In this illustration, the sealing disc 126 is bulged somewhat in extrusion direction owing to the water pressure in the water collection container 14.

Figure 9:
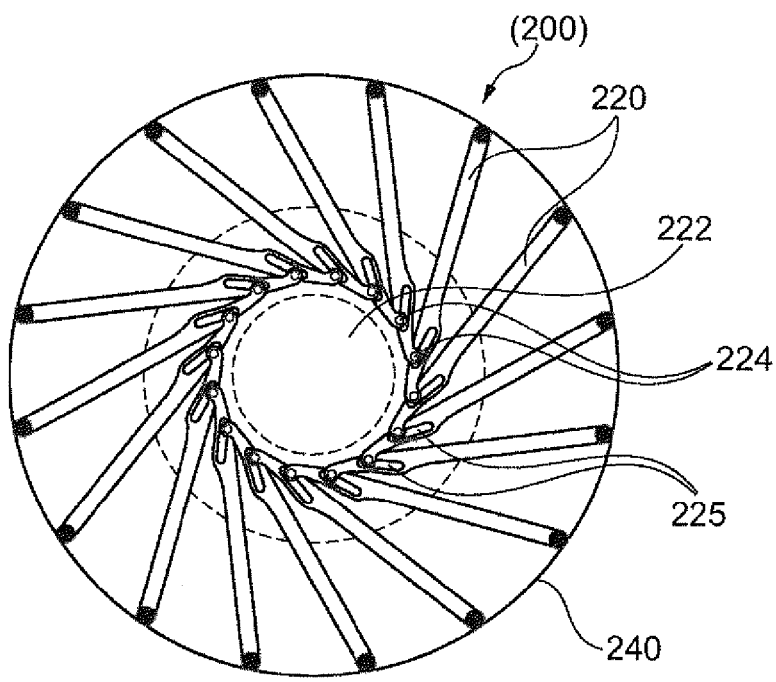
FIG. 9 shows a portion of a seal according to the invention in accordance with a second example embodiment of the invention with pivotable struts as clamping means.

FIG. 9 shows the configuration of the clamping means as struts 220 in a seal 200 according to the invention in accordance with a second example embodiment of the invention. The struts 220 are arranged substantially in a plane perpendicularly to the extrusion direction and form in their centre, on the extrusion axis, a passage opening 222. On an outer diameter with respect to the passage opening 222 with the extrusion axis as central point, a frame 240 is arranged. The struts 220 are mounted pivotably in the frame 240 by their ends facing away from the extrusion axis, whilst their ends facing the extrusion axis lie approximately tangentially against the passage opening 222 and are mounted so as to be displaceable into one another. In this example embodiment, for this displaceable connection of the ends of the struts 220 facing the extrusion axis a pin 224 running parallel to the extrusion axis and an elongated hole 225 in the strut, directed to the frame 240, are provided at each of these ends. Each pin 224 engages into the elongated hole 225 of the adjacent strut 220 and is displaceable therein. By pivoting the struts 220 in the frame 240, the pins 224 move in the elongated holes 225 so that the passage opening 222 is increased or decreased in size. The diameter of the frame 240 is selected here to be so large that the pins 224, in the case of a change in diameter of the passage opening 222, describe a path which lies almost on the radius of the frame 240.

In this example embodiment, the pins 224 are lengthened so that, in an analogous manner to the first example embodiment, they constitute carrier pins onto which a sealing disc, not illustrated in this example embodiment, with carrier rings (analogous to the first example embodiment, see FIGS. 5 and 6) can be fitted. The mode of operation in the case of a change of diameter is then likewise analogous to the first example embodiment.

The larger the diameter of the frame 240, the more the curve of the pins 224 comes close to the radius line in the case of a change of diameter of the passage opening 222. It is therefore advantageous to select as large a diameter as possible for the frame 240, in order to prevent a twisting of the sealing disc about the extrusion axis.

Figure 10:
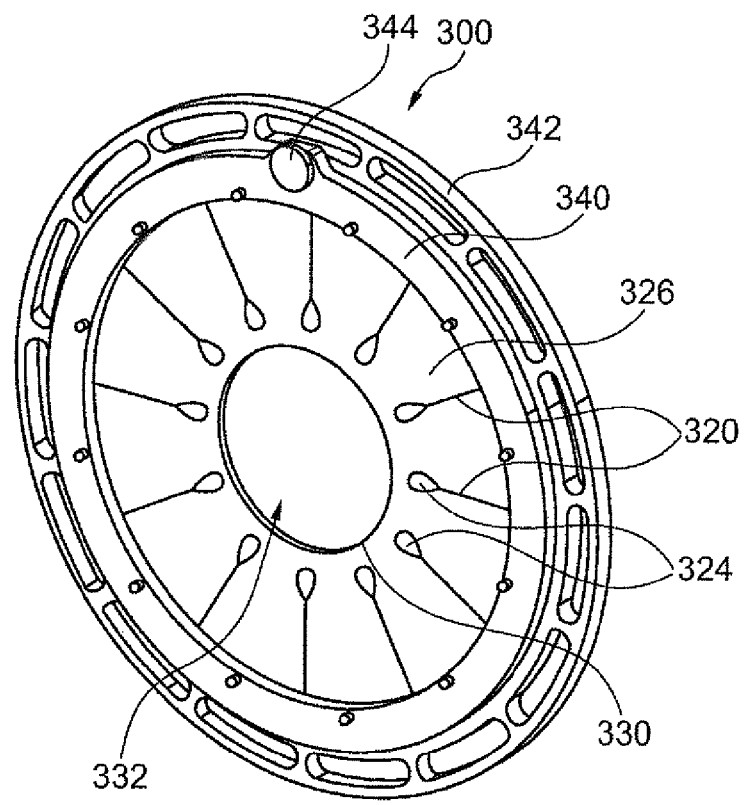
FIG. 10 shows a seal according to the invention in accordance with a third example embodiment of the invention with vulcanized-in wire cables as clamping means.

FIG. 10 shows a seal 300 according to the invention in accordance with a third example embodiment of the invention. An elastic sealing disc 326, for example made of rubber, is illustrated therein, with a through-passage opening 332 and a sealing rim 330 surrounding the through-passage opening. Wire cables 320 as clamping means and thimbles or respectively loops 324 as connecting means between two layers of the sealing disc 326, for example made of rubber, are vulcanized in to the sealing disc 326. The wire cables 320 are arranged radially with respect to the extrusion axis and form at their end facing the through-passage opening 332 the thimbles 324 in one piece. Within the thimbles 324, anchor discs 328 (FIG. 12), for example likewise made of rubber, are vulcanized in as connection means between the two layers of the sealing disc 326. The thimbles 324 are therefore fixed in the sealing disc, whilst the wire cables 320 are displaceable in the sealing disc, so that by traction on the wire cables 320 the diameter of the through-passage opening 332 is enlarged.

The sealing disc 326 is enclosed in an approximately planar manner into a frame 340. A circumferential wheel 342 is mounted rotatably around the frame 340. The circumferential wheel 342 can be fixed in its rotation position by a retaining screw 344. The wire cables 320 are fixed on the circumferential wheel 342 and are deflected by rotation of the circumferential wheel 342 on the frame 340, so that their radial length is shortened and the sealing rim 330 is widened.

Figure 11:
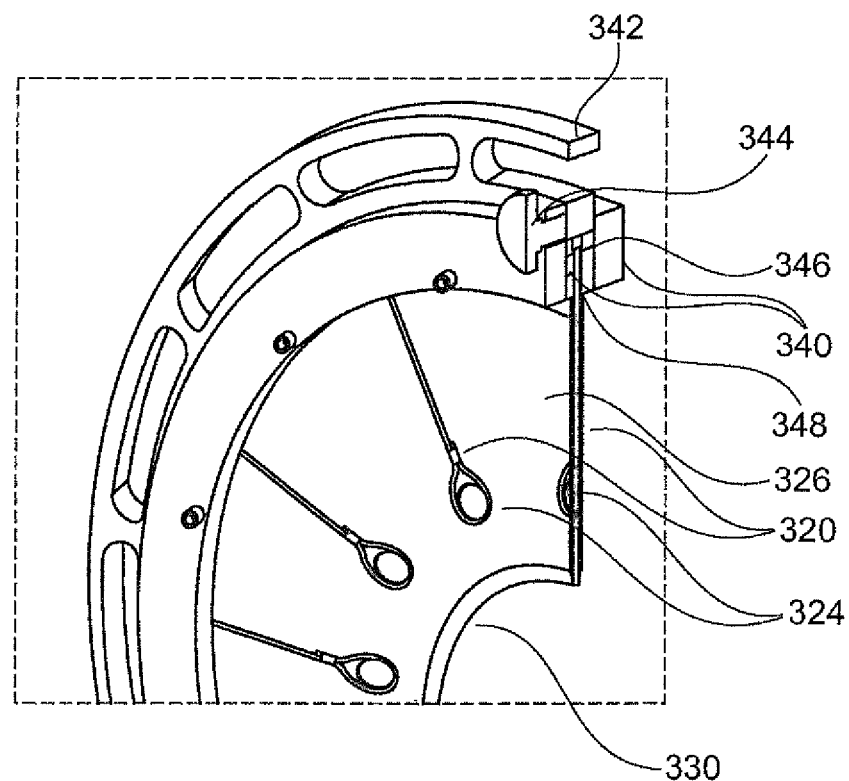
FIG. 11 shows an enlarged sectional illustration of FIG. 10 with wire cable mount in the circumferential wheel.

FIG. 11 shows an enlarged sectional illustration of FIG. 10. The fastening of the wire cables 320 on the circumferential wheel 342 in wire cable mounts 346 to receive the wire cables 320 by their end facing away from the through-passage opening 332 can be seen therein. A channel 348, running in the frame 340, in which the wire cables 320 run along when the circumferential wheel 342 is turned from the initial position and the radial sections of the wire cables 320 are shortened, can also be seen.

Figure 12:
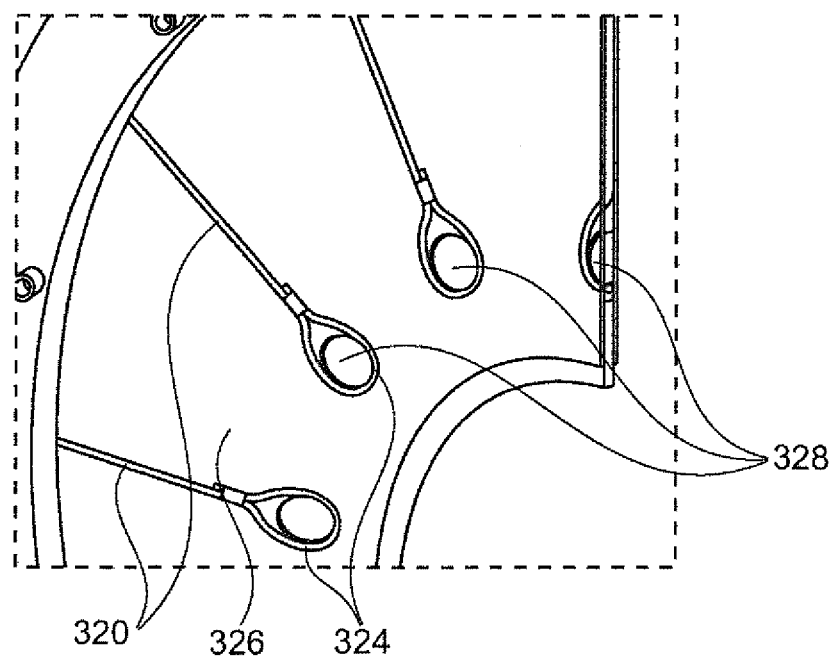
FIG. 12 shows an enlarged sectional illustration of FIG. 10 with anchor discs in the thimbles.

FIG. 12 also shows an enlarged sectional illustration of FIG. 10. Therein, the anchor discs 328, vulcanized in within the thimbles 324, which fix the thimbles 324 in the sealing disc, are emphasized. In this example embodiment, wire cables 320, thimbles 324 and anchor discs 328 are vulcanized in between two layers of the sealing disc 326.

The invention claimed is:

1. A seal for use in an extrusion device for producing continuous profiles, said seal comprising:
   an elastic sealing disc arranged in a plane substantially perpendicular to an extrusion direction and having a through-passage opening for passage of a continuous profile, said sealing disc having a sealing rim for bearing against the continuous profile, and connection members arranged along the sealing rim, said sealing disc having two layers which are securely connected with one another; and
   a clamping means configured to exert a force on the connection members in radial relationship to an extrusion axis and arranged in a plane parallel to the sealing disc, said clamping means including clamping elements arranged to actively modify a diameter of the opening and connecting means configured to connect the connection members to the clamping elements, wherein the clamping elements of the clamping means are configured as wire cables aligned radially with respect to the extrusion axis.

2. The seal of claim 1 for use in an extrusion device for producing continuous profiles in the form of plastics pipes.

3. The seal of claim 1, further comprising a circumferential wheel mounted for rotation about the sealing disc and the extrusion axis to provide a drive for engagement of the wire cables such that a radial length of the wire cables is changed when the circumferential wheel rotates.

4. The seal of claim 1, wherein at least one of the connection members, the connecting, means, and the clamping elements, is arranged at least partially between the layers.

5. The seal of claim 1, wherein the connection members are securely connected with the sealing disc.

6. The seal of claim 1, wherein the wire cables have ends facing, the extrusion axis, said connecting means of the clamping means being provided on the ends of the wire cables and configured as loops.

7. The seal of claim 1, wherein the connection members of the sealing disc are configured as anchor discs and arranged securely between the layers of the sealing disc, said clamping elements of the clamping means being configured as loops to embrace the connection members of the sealing disc.

8. The seal of claim 1, wherein the connection members of the sealing disc are configured as eyes which are arranged at least partially between the layers of the sealing disc and securely connected to the layers.

9. The seal of claim 8, wherein the wire cables have ends facing the extrusion axis, said connecting means of the clamping unit being arranged at the ends of the wire cables and configured as hooks which engage into the eyes of the sealing disc.

10. The seal of claim 1, wherein the connection members are vulcanized into the sealing disc.

\* \* \* \* \*